(12) United States Patent
Schadt et al.

(10) Patent No.: US 9,321,962 B2
(45) Date of Patent: Apr. 26, 2016

(54) LIQUID CRYSTAL ORIENTATION LAYER

(75) Inventors: Martin Schadt, Seltisbert (CH); Hubert Seiberle, Weil am Rhein (DE); Olivier Muller, Bollwiller (FR)

(73) Assignee: ROLIC AG, Zug (CH)

( * ) Notice: Subject to any disclaimer, the term of this patent is extended or adjusted under 35 U.S.C. 154(b) by 0 days.

(21) Appl. No.: 11/392,714

(22) Filed: Mar. 30, 2006

(65) Prior Publication Data

US 2006/0194000 A1 Aug. 31, 2006

Related U.S. Application Data

(63) Continuation of application No. 09/646,456, filed as application No. PCT/IB99/00479 on Mar. 22, 1999, now abandoned.

(30) Foreign Application Priority Data

Mar. 20, 1998 (CH) ......................................... 678/98

(51) Int. Cl.
| | |
|---|---|
| *C09K 19/38* | (2006.01) |
| *G02B 5/30* | (2006.01) |
| *G02F 1/1337* | (2006.01) |
| *C09K 19/56* | (2006.01) |

(52) U.S. Cl.
CPC .............. *C09K 19/3852* (2013.01); *C09K 19/38* (2013.01); *C09K 19/3861* (2013.01); *G02B 5/3016* (2013.01); *G02F 1/133753* (2013.01); *G02F 1/133788* (2013.01); *C09K 19/56* (2013.01); *Y10T 428/10* (2015.01)

(58) Field of Classification Search
CPC .................... G02F 1/133788; G02F 1/133753; G02B 5/3016; Y10T 428/10; C09K 19/56
See application file for complete search history.

(56) References Cited

U.S. PATENT DOCUMENTS

| | | | | |
|---|---|---|---|---|
| 4,803,147 | A | * | 2/1989 | Mueller et al. ............. 430/288.1 |
| 5,389,698 | A | | 2/1995 | Chigrinov et al. |
| 5,602,661 | A | * | 2/1997 | Schadt et al. ................. 349/124 |
| 5,604,615 | A | | 2/1997 | Iwagoe et al. |
| 5,623,354 | A | | 4/1997 | Lien et al. |
| 5,667,854 | A | * | 9/1997 | Yamada ........................ 428/1.31 |
| 5,786,041 | A | * | 7/1998 | Takenaka et al. ............... 428/1.2 |
| 5,795,629 | A | | 8/1998 | Harada et al. |
| 5,859,682 | A | | 1/1999 | Kim et al. |
| 5,903,330 | A | * | 5/1999 | Funfschilling et al. ....... 349/129 |
| 6,001,277 | A | | 12/1999 | Ichimura et al. |
| 6,027,772 | A | * | 2/2000 | Han ................................ 428/1.1 |
| 6,040,890 | A | | 3/2000 | Sawada et al. |
| 6,046,849 | A | * | 4/2000 | Moseley et al. ................ 359/465 |
| 6,107,427 | A | | 8/2000 | Herr et al. |
| 6,316,574 | B1 | | 11/2001 | Tanioka et al. |
| 6,335,409 | B1 | | 1/2002 | Herr et al. |
| 6,340,506 | B1 | | 1/2002 | Buchecker et al. |
| 6,399,165 | B1 | * | 6/2002 | Kwon et al. .................... 428/1.2 |
| 2007/0126966 | A1 | * | 6/2007 | Takahashi ..................... 349/130 |

FOREIGN PATENT DOCUMENTS

| | | | |
|---|---|---|---|
| DE | 44 20 585 A1 | | 12/1995 |
| EP | 0 763 552 A2 | | 3/1997 |
| GB | 2310934 | * | 9/1997 |
| JP | 3-140922 A | | 6/1991 |
| JP | 7-72483 A | | 3/1995 |
| JP | 10-195296 A | | 7/1998 |
| JP | 10-232400 A | | 9/1998 |
| WO | WO 9738349 | | 10/1997 |
| WO | WO98/52077 | * | 11/1998 |

OTHER PUBLICATIONS

Dyaduysha et al Peculiarity of an oblique liquid crystal alignment induced by a photosensitive orientant, Jpn J. Appl Phys, vol. 34 (1995), pp. 1000-1002.*
Nishikawa et al Generation of pretilt angles on polyimides with single linearly polarized UV exposure, Mol. Cryst Liq. Cryst, 1999, vol. 329, pp. 579-587.*
Shadt et al Surface induced Parallel Alignment of Liquid Crystal by Linearly Polymerized Photopolymers, Japanese Journal of Applied hysics, vol. 31(1992), pp. 2155-2164, Jul. 1992.*
Abstract of DE 44 20 585 A1.
Chigrinov et al., "physics and Applications of LC Photo-Alignment: Recent Results," XP-002081691, SPIE, vol. 3318, pp. 454-464 (1998).
Derwent Abstract 1986-295129, JP 61217020A, Sharp KK.
Polymer Science Dictionary, $2^{nd}$ Edition, 1997, p. 463, Alger.
Schadt et al., "Surface-Induced Parallel Alignment of Liquid Crystals by Linearly Polymerized Photopolymers," Jpn. J. Appl. Phys., vol. 31 pp. 2155-2164, Part 1, No. 7 (1992).
Schadt et al., "Photo-Induced Alignment and Patterning of Hybrid Liquid Crystalline Polymer Films on Single Substrates," Jpn. J. Appl. Phys., vol. 34, pp. L764-L767, Part 2, No. 6B (1995).
Yeh et al., Optics of Liquid Crystal Displays, pp. 15-18 (1999).
Yinghan Wang et al., "Homogeneous alignment of nematic liquid crystal induced by polyimide exposed to linearly polarized light," Appl. Phys. Lett, vol. 72, No. 5, pp. 545-547 (1998).

* cited by examiner

*Primary Examiner* — Gregory Listvoyb
(74) *Attorney, Agent, or Firm* — Sughrue Mion, PLLC

(57) ABSTRACT

Linearly photopolymerized (LPP) orientation layers for liquid crystals, that is to say liquid crystal orientation layers, are oriented and crosslinked by means of linearly polarized light. The properties of an LPP orientation layer, such as the angle of tilt, surface wetting, voltage holding ratio and anchoring energy, can be adjusted and/or improved by mixing further substances into the starting material for the preparation of the orientation layer.

14 Claims, No Drawings

LIQUID CRYSTAL ORIENTATION LAYER

This is a continuation of application Ser. No. 09/646,456, having a §371(c) filing date of Nov. 20, 2000 now abandoned, the entire contents of which are incorporated by reference, which is a 371 application of PCT/IB99/00479, filed on Mar. 22, 1999, which claims benefit of priority of Swiss Application No. 98/678, filed on Mar. 20, 1998

The present invention relates to a material that comprises a substance that can be oriented and crosslinked by the action of linearly polarised light and which is used in the preparation of an orientation layer for a liquid crystal medium, and to an orientation layer for a liquid crystal medium and to an optical or electro-optical device having at least one such orientation layer.

Such orientation layers are used especially in liquid crystal displays, but also in many other optical and electro-optical elements and components such as colour filters, polarisation filters, retarder layers, security elements. etc., in which the liquid crystals may also be used in polymerised or crosslinked form.

The electro-optical effect in liquid crystal displays (LCD) is substantially determined by the angle of twist through which the liquid crystal molecules pass from one side of the substrate to the other. Especially the contrast, brightness, viewing angle dependency and speed of the display, as well as the voltage required to actuate the liquid crystal display, can be adjusted to an optimum by means of the angle of twist. The liquid crystal properties required to obtain the electro-optical effect, such as the optical or the dielectrical anisotropy, are determined by the angle of twist.

In order to establish a desired angle of twist, a preferred direction must be imposed on both substrate sides in contact with the liquid crystal. For that purpose, it is customary to apply to both substrate sides a thin polymer layer which is then rubbed in one direction, for example with a cloth. Liquid crystals in contact with the orientation layer become oriented according to that preferred direction. The liquid crystal molecules must be sufficiently strongly anchored to the orientation layer for the molecules on the substrate surface to remain oriented in the desired direction, although the directions of orientation on the two substrate sides are generally different and, as a result restoring forces occur. In that manner, it is possible to produce left- or right-rotating liquid crystal layers having an angle of twist of up to about 89°.

At angles of 90° and above between the directions of orientation of the two substrates, the problem arises that the twist can occur either to the left or to the right, which, especially in the commercially widely available 90'-twisted liquid crystal displays, can result in areas being produced in which the liquid crystal rotates in the wrong direction (reverse twist), which leads to light scatter and a spotty appearance of the display.

When a suitable material is used for the orientation layer, however, the rubbing induces what is known as an angle of tilt in that layer. As a result, the liquid crystals become oriented slightly obliquely relative to the surface of the substrates. The direction of the angle of tilt on both substrate sides determines the direction of rotation, thus reducing "reverse twist" phenomena.

In order to avoid "reverse twist", chiral doping agents which induce an intrinsic twist having a defined direction of rotation can also be added to the liquid crystal. Chiral doping agents cannot, however, prevent the problem of "reverse tilt" in which individual areas of the liquid crystal become tilted in the wrong direction. The only solution to that problem is to preset the direction of tilt in the orientation layer.

It is not only the direction of tilt but also the size of the angle of tilt which is of decisive importance for the functioning of a liquid crystal display. For example, in supertwisted nematic (STN) LCDs, depending upon the angle of twist an angle of tilt of several degrees is needed to prevent the occurrence of what are known as fingerprint structures (troublesome dislocations). In addition, the threshold voltage, the switching speed and the contrast of STN LCDs are dependent to a highly sensitive degree upon the size of the angle of tilt.

Substantial use is made of polyimides as material for orientation layers in commercial liquid crystal displays. The large number of different polyimides available as orientation layers differ from one another essentially by the angle of tilt that can be obtained by rubbing. The large angles of tilt of 15° or more that are required for various uses cannot, however, be obtained using rubbed polyimides. Thus, commercially obtainable polyimides cover only the range of angle of tilt of about from 0° to 10°.

Apart from being characterised by their orientation properties, polyimides are distinguished by the fact that they do not greatly increase the conductivity of the liquid crystal. This is important especially in the case of LCDs of the thin-film transistor twisted nematic (TFT-TN) type in which an amount of charge is applied over the course of a very short period of time to the electrodes of a pixel and must not subsequently drain away by means of the resistance of the liquid crystal. The ability to hold that charge and thus to hold the voltage drop over the liquid crystal is quantified by what is known as the "voltage holding ratio" (VHR).

Although polyimides are very suitable as orientation layers by virtue of their good orientation properties and their TFT-compatibility, there are a number of serious disadvantages that have less to do with the material itself than with the rubbing technique used to obtain the orientation. For example, in high-purity production environments, dust is produced by the matter abraded during the rubbing process. The rubbing process also produces electrostatic charges on the surface of the substrate which, on the one hand, may destroy the thin-film transistors integrated under each pixel in TFT-LCDs and, on the other hand, attract additional dust.

The abrasion method is also subject to limitations because the increase in the miniaturisation of LCDs, especially for use in projectors, and the growth in the number of pixels for high-resolution displays are resulting in ever smaller electrode structures, the dimensions of which are, in some cases, distinctly smaller than the diameter of the brush hairs used for the rubbing. Because of the topology of the substrate surfaces in TFT-LCDs, which is determined by the structure of the thin-film transistors, there are, for example, shadow areas that cannot be rubbed at all by the coarse fibres.

For some years, polarisation-sensitive photopolymers have been known in which the orienting is effected, without any contact at all, by irradiation with linearly polarised light. On the one hand, this obviates the problems inherent in the rubbing process and, on the other hand, in contrast to the rubbing process, it is possible to preset different orientation directions in different areas, for example by using masks. In such photo-orientable layers e.g. described in Patent Specification U.S. Pat. No. 5,389,698, an anisotropic polymer network is synthesised by irradiation with linearly polarised light, which polymer network is generally photostable and its orientation thus can not be changed by further orienting. Such orientation layers, known as "linearly photopolymerised" (LPP) orientation layers, also sometimes referred to as "photo-oriented polymer networks" (PPN), can comprise highly complex orientation patterns. They are used not only in liquid crystal displays but also in the manufacture of other optical elements, such as polarisation interference filters, linear and cholesteric polarisation filters, optical retarder layers, etc. To simplify nomenclature, such orientation layers oriented and crosslinked by irradiation with linearly polarised light will also be referred to in the context of the present invention as LPP orientation layers, and the materials used for preparing the layer will be referred to as LPP material.

The angle of tilt required for the functioning of the LCDs can be induced in LPP orientation layers by a method described, for example, in European Patent Application EP-A-756 193, reference being made explicitly herewith to the content thereof. In that method, the light used to crosslink the LPP orientation layer is made to fall obliquely on the surface. In contrast to the rubbing method, depending upon the LPP material used angles of tilt of from 0° to 90° can be established. Of course, as is known of rubbed orientation layers, also in LPP orientation layers the angle of tilt imparted to the liquid crystals is dependent not only upon the orientation material itself but also upon the liquid crystal mixture used.

A disadvantage of the LPP materials known hitherto is that they have not yet attained the high voltage holding ratio values of the polyimides that have been specially optimised for TFT displays.

Surprisingly, it has now been found that the properties of an LPP orientation layer, such as, for example, the angles of tilt produced by the layer, the surface wetting, the voltage holding ratio, the anchoring energy, etc., can be changed and can thus be adjusted and/or improved by mixing other polymers, oligomers or, where appropriate, also monomers into the starting material for the preparation of the orientation layer.

This opens up wide scope for adapting LPP orientation layers to an extremely wide range of requirements and fields of use.

According to the invention, particularly interesting properties in the orientation layer/liquid crystal medium system that can be influenced by the addition of a further substance are the angle of tilt, the holding ratio and the anchoring energy.

In particular, the angle of tilt which is imparted to the liquid crystal layer by the LPP orientation layer can be adjusted by the use of a mixture of two (or more) LPP materials. The angle of tilt can be varied within a wide range by means of the mixing ratio of the LPP materials. It has been shown that the limit values of the angles of tilt that can be obtained are generally predetermined by the individual LPP materials, whereas all the intermediate values can be obtained by mixing the LPP materials. Thus, for any given liquid crystal mixture advantageously two LPP materials will be sufficient to adjust and/or to optimise the angle of tilt for the use in question. In other embodiments, it may, however, be equally advantageous to use three or more LPP materials. Suitable for practical adjustment of angles of tilt are especially combinations of LPP materials, the "intrinsic angles of tilt" of which differ from one another preferably by at least one degree, more especially by at least three degrees. In the present context, "intrinsic angle of tilt" means the angle of tilt induced (in a particular liquid crystal medium) by an orientation layer consisting solely of the LPP material in question.

Moreover, since the angle of tilt imparted to the liquid crystal layer depends also upon the liquid crystal material, it is also possible to induce the same angle of tilt in different liquid crystal mixtures by adapting the composition of the LPP orientation layer to the liquid crystal mixture in question.

According to the invention, by mixing in other polymers, oligomers or monomers the LPP orientation layer can also be improved to the effect that fewer ionic impurities are released by the orientation layer into the liquid crystal mixture, and/or ionic impurities present in the liquid crystal mixture are taken up by the orientation layer, which improves the holding ratio. This can be achieved, for example, advantageously by using a mixture of a LPP material with a polyimide or a plurality of polyimides as orientation material.

It is possible to use commercially available polyimides suited for TFT-LCD applications, added in a few percent by weight to non-polyimide LPP materials, to considerably increase the voltage holding ratio. Due to the dilution of the LPP material by such polyimides not having crosslinkable units the probability of crosslinking decreases, usually quadratically with the amount of LPP material, and thus the exposure energy required to achieve a certain crosslinking rate increases.

In a more preferred embodiment of the invention therefore polyimides—or their analogeous polyamic acids—are used which are themselves LPP materials. i.e. which can also be oriented and crosslinked by the action of linearly polarised light. Such LPP polyimides (and polyamic acids) are for example described in the International Patent Application PCT/IB98/01425 of Rolic AG. Blends of LPP materials comprising LPP polyimides having themselves crosslink-able units have the advantage that the content of polyimide can be increased without reducing the crosslinking rate. As a consequence of the high amount of polyimide the voltage holding ratio can be increased further. Another of mixing mainly LPP materials instead of adding standard main-chain polyimides is the miscibility, which is generally better if the molecular structure of the compounds to be mixed are more similar. In the simplest case, the LPP material comprises only two LPP substances, one of them having polyimide main-chain.

Particularly advantageous materials contain at least one LPP polyacrylate and at least one LPP polyimide because often the voltage holding ratio can be improved by an LPP polyimide whereas other properties, in particular the angle of tilt, can be better adapted using an LPP polyacrylate.

The proportion of the additional substance depends upon the prevailing circumstances. Generally, the desired effects manifest themselves only when the proportion is at least half a percent by weight or more. In many cases, however, a larger proportion is necessary or, for example from the point of view of production technology, desired. For example, the larger the proportion used, the easier it is to meter in the substance and/or the more precisely the property that is influenced by that substance can be adjusted. Preferably, the proportion is at least one percent by weight more especially five percent by weight.

In order to avoid any misunderstandings, it should specifically be pointed out that the invention is in no way limited to liquid crystal cells in which a liquid crystal layer lies between two orientation layers; the invention is equally suitable for uses in which the liquid crystals are oriented on a single layer.

It will also be understood that according to the invention it is possible to use not just one further substance but also a plurality of further substances in the LPP material, and any desired combination of polymers, oligomers and monomers can be taken into consideration.

The invention will be illustrated further by the following Examples.

EXAMPLE 1

LPP Orientation Layer of a Material that (in a Manner Known Per Se) Comprises Only One Substance In LPP materials having the property that the LPP orienting is effected by UV irradiation parallel to the direction of polarisation of the UV light, angles of tilt can be induced in a single irradiation step. LPP A, the structure of which is shown below, has that property.

LPP A:

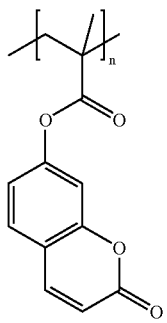

LPP A was synthesised according to the procedure described under Example 1 in the International Patent Application having the publication number WO-96/10049.

For its application to a substrate, LPP A was dissolved to 3% by weight in N-methyl-pyrrolidone (NMP) and stirred for half an hour at room temperature. The solution was then applied by spin-coating to a glass plate over the course of one minute at 2000 rev/min. The layer was subsequently dried for 30 minutes on a hotplate at 130° C.

For the photo-orientation, a 200 W extra high pressure mercury vapour lamp was used which, in the range from 300 nm to 350 nm, provided an intensity of mW/cm² at the site of the LPP layer to be irradiated. In order to induce an angle of tilt, the coated glass plate was arranged at an angle of 400 relative to the direction of radiation of the UV lamp and was irradiated for 25 minutes. The direction of polarisation of the light lay in the plane defined by the plate normal and the direction of UV incidence.

A parallel cell was constructed using a second LPP-coated glass plate that had been manufactured according to the same method as the first plate. The spacing between the plates was set at 20 μm using a glass thread. The cell was then filled with the nematic liquid crystal mixture 7415 from Rolic Research AG at a temperature of just above the clear point of the mixture ($T_c$=81.6° C.) and cooled slowly. The angle of tilt imparted to the liquid crystals was measured optically by means of the crystal rotation method. An angle of tilt of only 0.20 was produced.

EXAMPLE 2

LPP Orientation Layer of a Further Material that (in a Manner Known Per Se) Comprises Only One Substance Like LPP A, LPP B, the structure of which is shown below, is also to be oriented parallel to the direction of polarisation of the UV light.

The preparation of the starting compound for LPP B is described by M. Petrzilka in Mol. Cryst. Liq. Cryst. Vol. 131(1985), 109. LPP B can accordingly be synthesised analogously to the procedure described under Example 6 in European Patent Application EP-A-0 763 552.

Analogously to Example 1, a solution of 3% LPP B in NMP was prepared. Two glass plates were coated with that solution, as described in Example 1, and the two LPP-coated plates were irradiated obliquely with linearly polarised UV light at an angle of 40° for a period of irradiation of 25 minutes. Using those two plates, analogously to Example 1 a parallel cell was constructed and filled with the liquid crystal mixture 7415. A very large angle of tilt of 260 was subsequently measured by means of the crystal rotation method.

EXAMPLE 3

Influence of a Second Substance Upon the Angle of Tilt of the Orientation Layer

A mixture M1 was prepared that consisted of 95% by weight LPP A and, as further substance, 5% by weight LPP B. Analogously to Example 1, a solution of 3% M1 in NMP was prepared. As in the Examples above, two glass plates were coated therewith and irradiated obliquely with linearly polarised UV light. Again, using those two plates a parallel cell was constructed and filled with the liquid crystal mixture 7415. An angle of tilt of 4° was measured by means of the crystal rotation method.

A further mixture, mixture M2, that consisted of 85% by weight LPP A and 15% by weight LPP B, was prepared. Two glass plates were coated with a solution of 3% M2 in NMP and were irradiated obliquely with linearly polarised UV light. Again, using those two plates a parallel cell was constructed and filled with the liquid crystal mixture 7415. Measurement by means of the crystal rotation method resulted in an angle of tilt of 7°.

The angles of tilt measured in the Examples are collated in the following Table:

| material for the orientation layer | angle of tilt |
| --- | --- |
| A | 0.2° |
| M1: 95% by weight A + 5% by weight B | 4° |
| M2: 85% by weight A + 15% by weight B | 7° |
| B | 26° |

EXAMPLE 4

Voltage Holding Ratio

The specific resistance of a liquid crystal in a liquid crystal cell is determined substantially by the ionic impurities already present in the pure liquid crystal before its introduc-

LPP B:

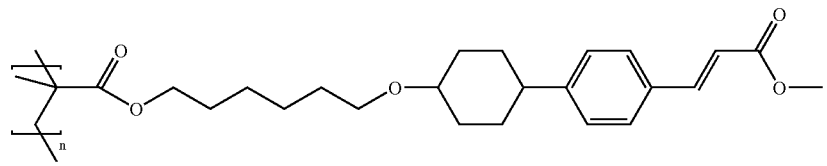

tion into the cell and by the ions additionally dissolved out of the orientation layer. The smaller the specific resistance of the liquid crystal, the faster the charge, which is applied to the pixel for only a short period of time of typically 64 μs, will drain away, that is to say the smaller the voltage holding ratio will be.

To measure the voltage holding ratio, a 90°-rotation cell was constructed in each case. In the present Example, for that purpose two ITO-coated glass plates were coated analogously to Example 1 by spin-coating with a 3% LPP A solution. In contrast to Example 1, the layers were, however, dried for one hour at 180° C. The two plates were then photo-oriented by means of irradiation with linearly polarised UV light. The two plates were then assembled to form a liquid crystal cell in such a manner that the two directions of orientation were at right angles to one another. Filling of the cell with the nematic liquid crystal mixture 8988 from Rolic Research AG produced a 90°-rotation cell. The 90°-rotation was detected by the fact that the cell appeared light between crossed polarisers and dark between parallel polarisers.

Measurement of the ohmic resistance of the cell showed the specific resistance of the liquid crystal to be $8.6 \times 10^{10}$ Ωm. With a frame time of 20 ms between two successive charge pulses, the result was a voltage holding ratio of 99.7%.

After that measurement, the cell was stored for three hours at 120° C. After the heating test, the specific resistance of the liquid crystal fell to $2.8 \times 10^{10}$ Ωm, that is to say it was smaller by a factor of approximately three which corresponds to a voltage holding ratio of 99.2%.

EXAMPLE 5

Improvement of the Voltage Holding Ratio by a Second Substance in the Material of the Orientation Layer In this Example, an orientation layer was prepared from a polymer mixture M3 that consisted of 90% by weight LPP A (see Example 1) and 10% by weight polyimide SE5291 obtainable from Nissan Chemical Indusiries. The polyimide SE5291 was supplied in the form of a 6% solution in a solvent mixture L1 that consists of 14% by weight diglycol monomethyl ether and 86% by weight γ-butyrolactone. To obtain a 3% polyimide solution, the commercial solution was therefore first diluted with 50% of the solvent mixture L1. A second solution of 3% by weight LPP A in L1 was prepared in parallel. The polyimide solution and the LPP A solution were then stirred together in a, ratio of 1:9.

Two ITO-coated glass plates were coated, analogously to Example 4, with the 3% solution of the polymer mixture M3 in L1 the plates were photo-oriented and finally a 90°-TN cell was constructed therefrom and again was filled with the liquid crystal mixture 8988.

The specific resistance of the liquid crystal was determined as being $17.6 \times 10^{10}$ Ωm. which corresponds to a voltage holding ratio of 99.9%. Compared with the cell having a pure LPP A orientation layer in Example 4, the specific resistance of the Liquid crystal in the cell having the orientation layer of polymer mixture M3 had therefore doubled.

As in Example 4, the cell was then stored for three hours at 120° C. After the heating test, the specific resistance of the liquid crystal fell to $7.9 \times 10^{10}$ Ωm, which corresponds to a voltage holding ratio of 99.7%. The specific resistance of the liquid crystal after the heating test was accordingly three times as high as in Example 4, where the pure LPP A was used as orientation layer.

The specific resistance values measured in the Examples are collated in the following Table:

| material for the orientation layer | specific resistance | specific resistance after 3 hours at 120° C. |
|---|---|---|
| A | $8.6 \times 10^{10}$ Ωm | $2.8 \times 10^{10}$ Ωm |
| M3: 90% by weight A, 10% by weight SE5291 | $17.6 \times 10^{10}$ Ωm | $7.9 \times 10^{10}$ Ωm |

The invention claimed is:

1. A material for the preparation of a photo-orientable orientation layer for a liquid crystal medium, the material being a mixture and comprising a first substance that is orientable and cross-linkable by the action of linearly polarized light such that the orientation for liquid crystals is parallel to the direction of polarisation and in which an angle of tilt with a defined direction can be generated in a single irradiation step by the action of linearly polarized light irradiated obliquely and at least one additional substance, wherein the at least one additional substance is a polyimide or a polyamic acid.

2. The material according to claim 1, wherein it comprises two or more polyimides or polyamic acids.

3. A material for the preparation of an orientation layer for a liquid crystal medium, the material being a mixture and comprising a first substance that is orientable and crosslinkable by the action of linearly polarized light such that the orientation for liquid crystals is parallel to the direction of polarisation and in which an angle of tilt with a defined direction can be generated in a single irradiation step by the action of linearly polarized light irradiated obliquely and at least one additional substance, wherein the at least one additional substance is so selected that the voltage holding ratio of such an orientation layer and contiguous liquid crystal medium would be improved relative to that using an orientation layer without the at least one additional substance.

4. The material according to claim 1 or 3, wherein the additional substance or substances so selected are present in a proportion of at least half a percent by weight.

5. The material according to claim 1 or 3, wherein the additional substance or substances so selected are present in a proportion of at least one percent by weight.

6. The material according to claim 1 or 3, wherein the at least one additional substance is orientable and cross-linkable by the action of linearly polarized light.

7. The material according to claim 1 or 3, wherein it comprises three or more substances that are orientable and cross-linkable by the action of linearly polarized light.

8. The material according to claim 1 or 3, wherein the at least one additional substance is a polyacrylate.

9. An orientation layer for a liquid crystal medium, wherein said layer comprises a material according to claim 1 or 3, which has been irradiated obliquely with linearly polarized light in a single irradiation step to orient and cross-link the first substance in said material.

10. An optical or electro-optical device, wherein said device comprises at least one orientation layer according to claim 9.

11. A method of making an orientation layer for a liquid crystal medium, said method comprising
   applying the material of claim 1 or 3 to a substrate, and
   obliquely irradiating the material with linearly polarized light in a single irradiation step to orient and cross-link the first substance in said material.

12. A method of making an orientation layer for a liquid crystal medium, said method comprising
   applying a material to a substrate, wherein the material is a mixture which comprises
      a first substance that is orientable and cross-linkable by the action of linearly polarized light such that the orientation for liquid crystals is parallel to the direction of polarisation and in which an angle of tilt with a defined direction can be generated in a single irradiation step by the action of linearly polarized light irradiated obliquely and
      at least one additional substance, wherein the at least one additional substance is so selected that the voltage holding ratio of the orientation layer and a contiguous liquid crystal medium would be improved relative to that using an orientation layer without the at least one additional substance; and
   obliquely irradiating the material with linearly polarized light in a single irradiation step to orient and cross-link the first substance in said material.

13. Material for the preparation of an orientation layer for a liquid crystal medium, the material comprising a first substance that can be oriented and crosslinked by the action of linearly polarised light, characterised in that the material comprises a further substance that can be oriented and crosslinked by the action of linearly polarised light, wherein the substances that can be oriented and crosslinked by the action of linearly polarised light are so selected that the angles of tilt induced by the substances when used on their own as orientation layer differ from one another by at least one degree.

14. Material according to claim 13, characterised in that the substances that can be oriented and crosslinked by the action of linearly polarised light are so selected that the angles of tilt induced by the substances when used on their own as orientation layer differ from one another by at least three degrees.

* * * * *